Oct. 25, 1938.  E. E. CHEWNING  2,134,437

FRUIT PACKING DEVICE

Filed May 27, 1936

Inventor
Emmett Eugene Chewning
By Brown & Phelps
Attorneys

Patented Oct. 25, 1938

2,134,437

UNITED STATES PATENT OFFICE 2,134,437

FRUIT PACKING DEVICE

Emmett Eugene Chewning, Perry, Ga., assignor of one-fourth to James Palmer Etheridge and one-fourth to William Cooper Jones, both of Perry, Ga.

Application May 27, 1936, Serial No. 82,108

5 Claims. (Cl. 217—3)

It has become universal practice in packing fruit such as peaches, apples, oranges, or the like, to arrange a layer of fruit to appear when the cover of the basket is removed, said layer being arranged in concentric circles, and of fruit of uniform size, the upper layer being convex in the top of the basket.

To this end it is the practice to provide a dish-shaped disk implement upon which the said layer is arranged and by means of a sheet metal collar containing a layer of paper the entire contents of the basket are placed in the collar and liner, whereupon the collar is removed and the basket inverted over the liner and fruit, which is then inverted for removal of the dish-shaped member, whereupon the cover of the basket is put into place and secured.

Since the fruit tends to roll to the center of the dish-shaped implement, it requires considerable skill to arrange the said first layer of fruit, and packers with this skill command high wages. It has been proposed in the patented art to provide an implement having a canvas diaphragm supported by a post to hold the diaphragm in an upwardly arched position above the disk whereby the first layer of fruit may be arranged easily and the fruit and implement may be lifted off of the post, allowing the fruit to settle to its final position.

It is an object of the present invention to provide a cushion member which goes with the fruit when sold and which will enable an unskilled packer to pack the fruit as well as is now done by skilled packers.

It is a further object of the invention to provide a method of packing fruit which may be carried out by unskilled labor.

Further objects of the invention will appear from the following description when read in connection with the accompanying drawing showing an illustrative embodiment of the invention, and wherein:—

As shown the cushion, which is desirably formed of paper material and may be formed by pressing of paper pulp to its finished form, comprises a disk 10 having an inwardly inclined margin or rim 11 about its periphery and desirably integral therewith.

In its initial form the cushion is shown as upwardly convex in its position for use. Since the disk must have sufficient rigidity to support the weight of the initial layer of fruit, indicated in dotted lines at 12, the cushion may be made of lighter material if its rigidity is increased by means of corrugations 13 shown as radially arranged upon the cushion.

For convenience in indicating the center of the cushion and for locating the central fruit piece, a depression 14 is shown in which depression the central fruit member may be placed.

Figure 1:
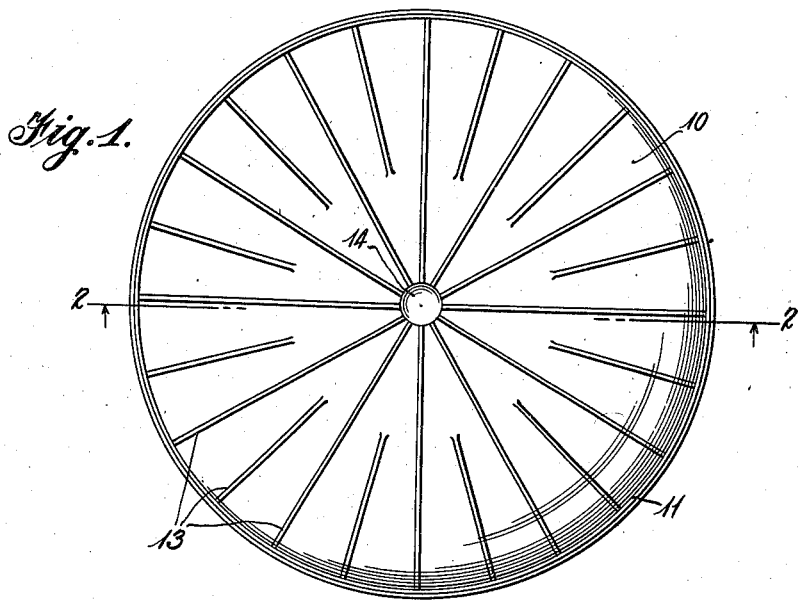
Figure 1 is a plan view of the cushion.
Figure 2:
Fig. 2 is a central transverse section on line 2—2 of Fig. 1.
Figure 3:
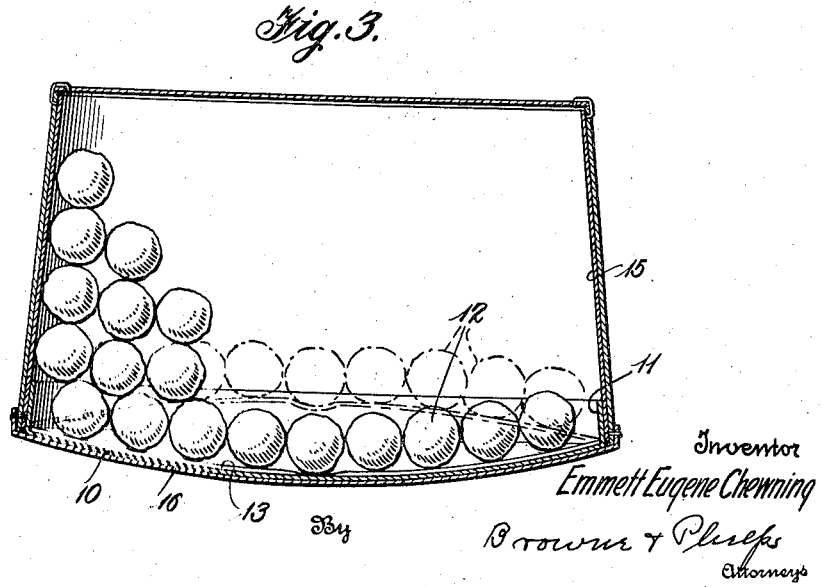
Fig. 3 is a central vertical section of a basket in inverted position packed by the process of the invention.

The cushion 10 may be utilized with the present form of sheet metal dish-shaped implement, and the rim 11 of the cushion should telescope with the paper liner 15, as shown in Figure 3. Instead of using the device with the sheet metal disk, the usual convex cover 16 of a basket may be used, upon which to initially place the cushion, collar and liner. The sheet metal collar is not shown in the drawing. When so used, the collar may be removed and the basket may be put in its place and secured whereupon the completed package may be inverted for storage.

There is in use a basket having a removable bottom as well as a removable cover. The present invention may be utilized with this form of basket, which is illustrated in Figure 3. When so used, the cushion member 10 may be supplied with the basket for sale with the cushion already in place in its initially arched position, arching inwardly from the cover of the basket.

When so used, it is only necessary to remove the bottom of the basket, place the initial layer of fruit upon the cushion upwardly arching in the inverted basket, whereupon the remainder of the contents of the package may be poured into the basket, the weight thereof causing the initial layer and the cushion to be reversed in its arched position by gravity, whereupon the bottom of the basket may be applied and the package is ready for shipment.

It will be seen that by the method of the invention no act is necessary on the part of the packer to reverse the arching of the initial layer of fruit, since this act is purely automatic under influence of gravity acting upon the superposed fruit in the inverted basket.

When the device and method of the invention are carried out with the solid bottomed basket by applying the cushion to the cover of the basket, using the sheet metal collar and liner as above described, the weight of the fruit poured into the collar acts, as above described, to automatically reverse the arch of the layer of fruit which is to be the top of the package, thus greatly facilitating the completion of the package and enabling the packing to be done by unskilled labor.

According to the present practice of packing fruit, each basket is treated as a unit and the packer must hold the fruit of the initial layer with one hand while inserting individual pieces with the other hand to complete the rings. By use of the present invention it is quite possible to place the baskets referred to above, with the bottoms removed, on a travelling conveyor or "assembly line." An unskilled laborer may handle a bag of graded fruit or the mouth of a canvas hose supplied by gravity from a bin of graded fruit, for the top layers, and allow a stream of fruit to flow upon the cushion device of the invention, so guiding the flow as to form the rings of the initial layer. A second operative may control the discharge from a chute so as to finish filling each basket as it passes, the weight thereof causing sinkage of said initial layer to final position. A third operative may place the bottoms, when the package will be complete.

Minor changes may be made in the physical embodiment of the invention, or in the steps of the process, within the scope of the appended claims without departing from the spirit of the invention.

I claim:

1. A preformed liner element for a fruit package in the form of a cushion cover comprising a disk of paper pulp material initially concave upon the side to be the outside in the package and of rigidity to support an initial layer of fruit but to yield to added weight of more fruit, whereby to reverse its concavity to become outwardly convex in the finished package.

2. A preformed liner element for a fruit package in the form of a cushion cover to form a part of the completed package, comprising a disk of paper pulp material initially concave upon the side to be the outside in the completed package and having sufficient rigidity to support an initial layer of fruit but insufficient to support the entire contents of the package in inverted position, and an annular rim integral about the edge of said disk, projected from the initially convex side of said disk.

3. A preformed liner element for a fruit package in the form of a cushion cover to form a part of the completed package, comprising a disk of paper pulp material initially concave on the side to be the outside in the completed package, said disk formed with stiffening corrugations and of rigidity to support an initial layer of fruit but to yield to added weight of the mass of fruit contents of an inverted package whereby to reverse its concavity to become outwardly convex in the finished package.

4. A preformed liner element for a fruit package in the form of a cushion cover to form a part of the completed package, comprising a disk of paper pulp material initially concave on the side to be the outside in the completed package, said disk formed with radial stiffening corrugations and of rigidity to support an initial layer of fruit but to yield to added weight of the mass of fruit contents of an inverted package whereby to reverse its concavity to become outwardly convex in the finished package.

5. A preformed liner element for a fruit package in the form of a cushion cover to form a part of the completed package, comprising a disk of paper pulp material initially concave upon the side to be the outside in the package, formed with a central concavity upon its initially convex side and with radial corrugations extending from said concavity towards its margins, said disk of rigidity to support an initial layer of fruit but to yield under the weight of added fruit superimposed on said initial layer to reverse its concavity to become outwardly convex in the finished package.

EMMETT EUGENE CHEWNING.